United States Patent [19]

Duewelhenke et al.

[11] Patent Number: 4,651,937
[45] Date of Patent: Mar. 24, 1987

[54] WITHDRAWING FIBER OPTICS FROM STORAGE PLATES

[75] Inventors: Rainer Duewelhenke; Joachim Meyer, both of Ratingen, Fed. Rep. of Germany

[73] Assignee: Frisch Kabel-Und Verseilmaschinenbau GmbH, Ratingen, Fed. Rep. of Germany

[21] Appl. No.: 801,093

[22] Filed: Nov. 22, 1985

[30] Foreign Application Priority Data

Nov. 28, 1984 [DE] Fed. Rep. of Germany ....... 3443336

[51] Int. Cl.⁴ .......................................... B65H 59/38
[52] U.S. Cl. ........................................ 242/45; 242/47; 242/54 R
[58] Field of Search .................. 242/45, 47, 54 R, 55, 242/75.5, 75.51, 128

[56] References Cited

U.S. PATENT DOCUMENTS

| | | | |
|---|---|---|---|
| 3,137,452 | 6/1964 | Winders | 242/45 X |
| 3,476,330 | 11/1969 | Curtland | 242/45 |
| 3,806,054 | 4/1974 | Johnson et al. | 242/128 X |
| 3,815,844 | 6/1974 | Wright et al. | 242/128 |
| 3,863,861 | 2/1975 | Bellasio | 242/128 |
| 4,582,271 | 4/1986 | Takahashi | 242/45 X |

*Primary Examiner*—Stanley N. Gilreath
*Attorney, Agent, or Firm*—Ralf H. Siegemund

[57] ABSTRACT

A light wave conductor or fiber optics is withdrawn from the peripheral groove of a rotating storage disc using a deflection pulley or the like rotating in a plane that runs tangential to a circle through the middle of the groove, a pivotal guide lever for the fiber conductor serves as input for speed control of the disc drive. In case of plural withdrawal equipment, the discs are vertically staggered and overlap.

3 Claims, 2 Drawing Figures

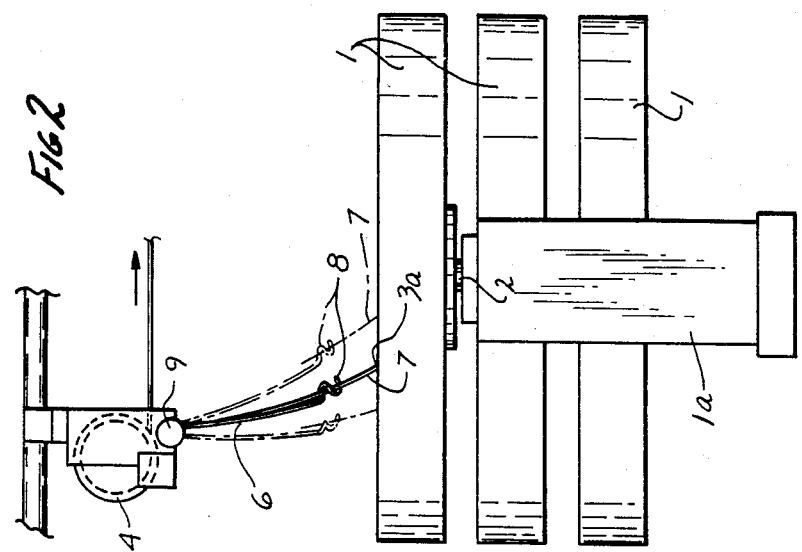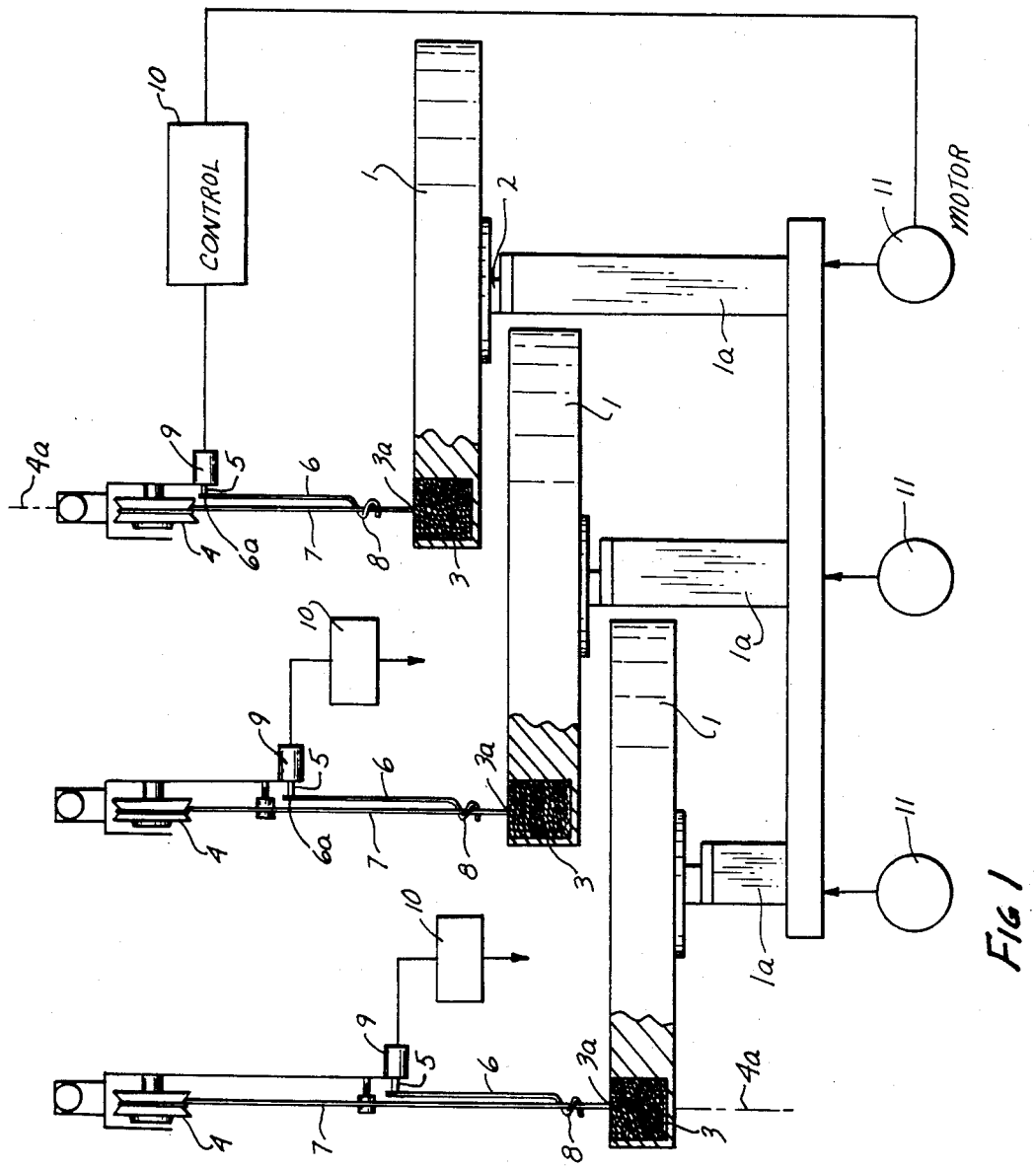

WITHDRAWING FIBER OPTICS FROM STORAGE PLATES

BACKGROUND OF THE INVENTION

The present invention relates to the withdrawing and taking up a light wave conductor (fiber optic) having been deposited in an angular groove in one front face of a disc or round plate. The withdrawing and taking up to be carried out through a free reeling deflection pulley or sheave having a stationary axis of rotation and providing for such a take-up and withdrawal so that the fiber optic can be fed to a further processing station.

Fiber optics, following manufacture, are often coiled and deposited in an angular groove in the front face of a plate or disc for temporary storage. When the time has come for further processing, the fiber optic and light wave condutor has to be withdrawn and here, as stated, one uses a deflection or take-up pulley or sheave. Common practice here is to dispose this particular pulley in the center, i.e., directly above the axis of rotation of the disc or plate, the disc or plate rotating during the take-up and withdrawing procedure. As the fiber optic is picked up and emerges, therefore, from the grove, it is further practice to provide a cone being coaxially arranged on the disc or plate, for feeding the light wave conductor and fiber optic to a funnel. This funnel, in turn, is likewise coaxially disposed with respect to the axis of rotation of the disc or plate whereby the larger opening of the funnel is oriented in downward direction, and it is this funnel which runs the light wave conductor to the deflection sheave or pulley.

The aforementioned conical- and funnel-shaped elements are required so that upon rotation of the disc a migration of the point of pick-up along the periphery of the groove is made possible for proper picking up of the conductor. However, this kind of an arrangement is disadvantaged by the fact that these coaxially arranged funnel and conical parts prevent a space- or area-saving arrangement when pick-up is desired from several different storage plates or discs simply because, for one reason or another, several fiber optics are to be structurally combined in the processing arrangement. In particular, a vertically staggered arrangement of such discs or plates is not possible. Moreover, it was found that this arrangement of conical- and funnel-shaped parts renders quite difficult the threading of a new fiber optic into the equipment provided for pick-up.

DESCRIPTION OF THE INVENTION

It is an object of the present invention to provide a new and improved device for picking up a light wave conductor and fiber optic from a peripheral groove in a rotating plate or disc, bearing in mind that the take-up or pick-up equipment should permit an overall space-saving arrangement and in addition threading of a new fiber optic into the take-up equipment should be rendered more easily.

In accordance with the preferred embodiment of the present invention, the object and other and further objects thereof are attained through the combination of the following features;

withdrawal and pick-up of the light wave conductor or fiber optic from the peripheral groove in a rotating disc or plate is carried out as far as the immediate pick-up is concerned by means of a deflection roll, pulley or sheave being situated, i.e., rotating in a plane which runs perpendicular to the plane of the surface of the disc having the groove and as far as vertical arrangement is concerned, this deflection sheave roll or pulley is arranged above a point which is in the center of that groove whereby the plane of rotation of the sheave pulley or roll runs tangential to a circle through that point, the circle extending concentric to the disc or plate;

a take-up lever is provided extending for more than half the vertical distance of the deflection roll, pulley or sheave from the disc, the lever having an open or closed eye at the end facing the disc or plate and being provided for guiding the light conductor or fiber optic while the opposite end of that lever is placed fairly close to the roll, pulley or sheave and in a pivotable fashion such that the lever can pivot either in the aforementioned vertical plane or through a plane parallel thereto whereby this particular lever is fastened to and extends from a rotatable shaft which extends perpendicular to the aforementioned plane;

this lever has normally a certain central position, but can be deflected therefrom on account of its pivotable mounting and cooperates in this fashion with a transducer responding to the variations in the lever deflection and providing an output which is used as an input for controlling the speed of the disc or plate.

The inventive arrangement offers the particular advantage that the deflection of the picked-up fiber optic and light wave conductor occurs in but one plane. The control of the rotational speed of the disc drive via the deflecting lever acting on a transducer permits to maintain the point of emergence of the fiber optics and light wave conductor from the disc within the plane as defined by the deflection roll, sheave or pulley. Particularly this latter feature obviates the prior art need of conical- and funnel-shaped guide elements. Moreover, threading of a new conductor into the take-up equipment is now rather easy on account of the fact that the pick-up operation occurs in that one particular plane.

In furtherance of the invention, equipment is proposed in which multiple fiber optics are taken up and withdrawn from a corresponding plurality of rotating discs or plates. These discs or plates are staggered in vertical direction and are arranged, moreover, that they overlap in a sense that one disc or plate extends to about the middle of a neighboring disc or plate. Thus, this vertically staggering and overlapping arrangement of discs or plates permits an assembly of parts which saves space considerably. Moreover, the points of pick-up of the various fiber optics and light wave conductors are now fairly closely spaced, roughly at a distance equal to a radius of one of these discs or plates and that, in turn, facilitates their mechanical combining, for example, into a common light transmitting structure.

As far as control of the rotational speed of the disks or plates are concerned, it is of advantage to consider always uniform starting or normal conditions. On the other hand, the arrangement proposed for multiple discs entails a different distance between deflection pulley sheave or roll and the respective disc or plate if all the sheaves, pulleys, or rolls are arranged more or less coaxially. In furtherance of the invention, it is therefore suggested to maintain constant the distance between the respective disc and the axis of pivoting of the respective pickup-up lever; in other words, the levers have their pivot ends placed at different distances from the respectives sheaves, rolls or pulleys.

DESCRIPTION OF THE DRAWINGS

While the application concludes with claims particularly pointing out the distinctive features of the invention, it is believed that the features of the invention, as well as the objects and advantages thereof will become more apparent from the accompanying drawings in which:

FIG. 1 is a side view of equipment improved in accordance with the preferred embodiment of the present invention for practicing the best mode thereof; and FIG. 2 is an end view of the equipment shown in FIG. 1.

Proceeding now to the detailed description of the drawings, the figures show three discs or plates 1 arranged on posts 1a being traversed by rotating shafts 2. The discs or plates 1 overlap in that each disc extends with its periphery to about the middle of a neighboring disc, there being of course sufficient clearance with regard to the post on which the respective discs are mounted in the illustrated manner. This placement is facilitated by a slight excentricity of the shafts 2 in the posts 1a.

Each disc or plate 1 is provided with an angular groove 3 extending along the periphery of each of the discs and down from the upwardly directed front face of each individual disc.

Reference number 4a denotes three parallel planes, their parallelism is not essential for the invention; essential, however, is that each of these planes extends precisely perpendicular to the plane of the rotation of the respective disc or plate with which such a plane 4a is associated. Moreover, each of these planes 4a traverses a particular point 3a associated with each of the plates or discs 1. This point pertains to a circle running in the center of a groove, as far as radial dimensions are concerned, and for example in the surface plane of rotation of each of the discs 1. Therefore, the respective plane 4a is a tangent plane to that particular circle in the particular point 3a.

In each instance, i.e., associated with each of the plates or discs 1, there is a deflection sheave, roll or pulley 4 rotating centrally in that particular plane 4a. In the illustrated example, the three sheaves, rolls, or pulleys 4 are arranged in the same level and are therefore coaxial in respect to each other on account of the parallelism of the three planes 4a. In each instance, a fiber optic or light wave conductor 7 is taken out of the respective groove 3 and run over the respective sheave, roll, or pulley 4 towards another processing station which is not shown.

The system, furthermore, includes three levers 6 arranged underneath the respective pulley, sheave or roll 4. The upper end 6a of each of the levers 6 is mounted on a pivot shaft 5. It is important that these shafts 5 have axes which have the same distance from the respective upper surface plane of each of the discs or plates 1. Upon pivoting of the shaft 5, the respective lever 6 pivots therewith essentially in a plane parallel to the respective plane 4a except that a kinked-off end 8 of each lever is constructed as an eye to grip the respective light conductor 7, and this end or eye 8 of a lever pivots with the lever 6, but in the respective plane 4a so as to maintain the respective light wave conductor 7 within that plane.

The shafts 5 are, so to speak, rotary input shafts for transducers 9 which monitor the angular deflection of the respective shaft 5 and, therefore, the respective pivot angle of the lever 6. The transducers 9 each produce an electrical output being representative of that deflection angle. By way of example, the transducer 9 may be a regular rotating type potentiometer whose effective resistance is changed upon pivoting of the lever 6.

Each transducer 9 feeds its electrical output to a control circuit such as 10, which in turn controls the respective disc drive motor 11 such that the respective lever 6 is maintained in a particular position, there being a separate motor and control circuit for each disk. It can thus be seen that the point of pick-up of the light conductor is peripherally shifted with deflection of the lever 6, as shown more clearly in FIG. 2, and the rotational speed of the disc is modified accordingly so that a central, middle, neutral or normal position of the arm or lever 6 is maintained.

The deflection of the lever 6 permits following of the point of pick-up of the light conductor as ultimately determined by the rotational speed of the respective disc 1. However, the deflection should be limited because if the deflection becomes extensive some significant disturbance may have occurred so that additional steps may have to be taken which go beyond the specifics of this invention. One can see, however, that the arrangement as shown is quite space-saving. The particular processing station which uses the three withdrawn fiber optics or light wave conductors may be arranged in front or in back of the plane of the drawing of FIG. 2, which is either to the left or to the right of the illustration of FIG. 2.

The invention is not limited to the embodiments described above, but all changes and modifications thereof, not constituting departures from the spirit and scope of the invention are intended to be included.

We claim:

1. Apparatus for taking up and withdrawing a light wave conductor or fiber optic from the peripheral groove in a rotatable disc comprising:

means connected to the disc for driving the disc;

a deflection roll, sheave, or pulley arranged above said disc, particularly above said groove such that a plane of rotation of the roll, sheave, or pulley is tangential to a circle running in the center of said groove;

a deflection lever having a pivot axis arranged underneath said pulley, sheave, or roll and extending for more than half the distance of said roll, pulley, or sheave from said disc, said lever having a pivoting end being provided with an eye for guiding said light wave conductor or fiber optic in said plane of rotation of said deflection sheave, roll, or pulley, said pivot axis extending transversely to said plane; and means connected to the means for driving, for controlling the speed of rotation of said disc as driven by the means for driving and including an input transducer connected to said pivot shaft of said lever to provide an input for speed control depending upon the pivotal deflection of said lever.

2. A plurality of devices as set forth in claim 1 the respective discs being staggered in vertical direction and overlap laterally.

3. In the plurality of devices as set forth in claim 2 wherein the respective pivot axes of the respective levers are situated at the same distance from the respective disc or plate.